3,355,484
PROCESS FOR MAKING BIODEGRADABLE
DETERGENTS
Herman S. Bloch, Skokie, Ill., assignor to Universal
Oil Products Company, Des Plaines, Ill., a corporation of Delaware
No Drawing. Filed Aug. 20, 1964, Ser. No. 390,996
6 Claims. (Cl. 260—505)

This invention relates to a process for the production of detergents and other surface active agents containing a hydrophobic alkylaryl radical which is subject to bacterial attack during sewage treatment. More specifically, this invention relates to a process for the production of surfactant product consisting of substantially straight-chain, alkyl-substituted aromatic compounds formed by condensing butadiene with an alkylbenzene containing an alphahydrogen group in the presence of an alkaline catalyst, thereby promoting side-chain telomerization, hydrogenating the unsaturated product under selective catalytic conditions to form the phenyl alkanes by side-chain hydrogenation, and introducing a hydrophilic radical into said phenyl alkane, as for example, by sulfonation. The resulting product which contains both a hydrophobic and a hydrophilic group is a detergent product subject to bacterial attack and degradation in a subsequent sewage treatment process after the detergent has been used in a laundering or other cleaning operation and discharged ultimately into such sewage treatment facilities.

One of the major problems prevalent in centers of population throughout the world is the disposal of sewage and the inactivation of detergents dissolved in the sewage in even small quantities. Such disposal problem is especially vexacious in the case of those detergents having an alkylaryl structure as the nuclear portion of the detergent molecule. These detergents produce stable foams in hard or soft water in such large quantities that the foam clogs sewage treatment facilities and often appears in sufficient concentration in such facilities to destroy the bacteria necessary for sufficient biological action for proper sewage treatment. One of the principal offenders of this type of detergent is the alkylaryl sulfonates, which, unlike the fatty acid soaps, do not precipitate when mixed with hard water containing calcium or magnesium ions in solution. Since these compounds are only partly biodegradable, the detergent persists in solution and is carried through the sewage treatment plant in substantially unchanged or still active form. Having an abiding tendency to foam, especially when mixed with aerating devices and stirrers, the material causes large quantities of foam to be discharged from the sewage digestion plant into rivers and streams where the continuing presence of the detergent is marked by large billows of foam on the surface. Other offenders of this type of detergent are the polyoxyalkylated alkylphenols and the polyoxyalkylated alkylanilines. These same synthetic detergents also interfere with the aerobic process of degradation of other materials such as grease and thus compound further the pollution caused by sewage plant effluents containing such detergents. These dilute detergent solutions often enter sub-surface water currents which feed into underground water strata from which many cities draw their water supplies and the alkylaryl-based detergents find their way into the water supplies drawn from water taps in homes, factories, hospitals and schools. Occasionally, these detergents turn up in sufficient quantities in tap water to make drinking water foam as it pours from the tap.

Although the effluents from cities' sewage plants may be clear and appear non-contaminated, many tons of synthetic detergents which have resisted the sewage treatment and which have survived the bacterial action normally present in open surface streams cause the formation of large masses of foam at the bottom of weirs and dams in water streams fed by sewage plant effluents from cities whose populations utilize large quantities of synthetic detergents. During 1959 over 1.5 billion pounds of surface active agents (on the unbuilt basis, exclusive of the inorganic salts added to commercial detergents) were sold in the United States. Of this quantity of synthetic detergents entering the sewage treatment facilities throughout the United States, it is estimated that 530 million pounds were of the bacterially, incompletely degradable (hard), synthetic alkylbenzene sodium sulfonate type.

An adequate supply of pure water, like clean air, is essential to the further growth and development of cities and the maintenance of human health standards. It has been found that alkylaryl-based detergents, such as the sodium sulfonate derivatives of these alkylaryl hydrocarbons, phenols, and amines, are more readily degradable by sewage bacteria if the long-chain alkyl substituent on the phenyl nucleus is of a simple, straight-chain configuration than if it is of a more complex branched-chain structure. As an example, detergent compounds containing an alkylaryl hydrophobic group in which the alkyl side-chain has a structure such as the following:

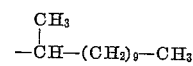

are more likely to be bacterially digested than detergents of the same chemical composition but in which the alkyl radical is a more highly branched-chain isomeric structure such as:

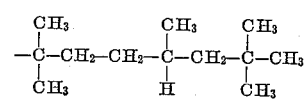

Thus, alkylaryl-based detergents in which the alkyl portion of the molecule has a relatively straight-chain structure, such as the alkyl group illustrated in the first of the two structures above, produce biologically soft detergents which readily undergo bacterial degradation in the treatment of sewage and do not appear as active detergents in the effluents of such sewage treatment plants.

It is an object of this invention to produce a detergent containing an alkylaryl group in which the alkyl side-chain attached to the aromatic nucleus has a relatively straight-chain structure capable of biological degradation during the treatment of sewage containing such detergents. Another object of this invention is to provide a method of attaching a substantially straight-chain alkyl group onto an aromatic nucleus to produce a structure suitable for the production of biologically soft detergents. It is another object of this invention to provide a method of forming a substantially straight-chain alkyl group and simultaneously attaching said straight-chain alkyl group to an aromatic nucleus to produce a structure suitable for the production of biologically soft detergents and without sacrifice of its water solubility.

In one of its embodiments this invention relates to a process for the production of detergents which comprises the steps: condensing butadiene with an alkylbenzene containing an alpha-hydrogen group in the presence of an alkaline catalyst at elevated pressure and temperature, hydrogenating the alkyl side-chain of the condensed product in the presence of a selective hydrogenation catalyst at elevated pressure and temperature to produce the phenyl alkane, and introducing a hydrophilic group into said phenyl alkane.

In another of its embodiments this invention relates to the step of condensing butadiene with an alkylbenzene containing an alpha-hydrogen group in the presence of an alkaline catalyst to produce the following compound:

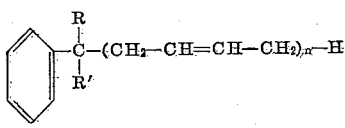

wherein R and R' are independently selected from the group consisting of hydrogen, methyl, ethyl, propyl or butyl, and $n$ is a number from 1 to 4.

The heart of this invention lies in the forming of the straight-chain alkyl group by the telomerization of butadiene with an alkylbenzene containing an alpha-hydrogen group. This reaction may be accomplished at elevated pressure and temperature in the presence of an alkaline catalyst comprising, preferably, an alkali metal, alkali metal amide, alkali metal oxide, alkali metal alkoxide or alkali metal hydride dispersed on a high surface support such as a refractory oxide. An especially preferable catalyst comprises potassium amide on lithiated alumina.

The side-chain telomerization reaction occurs as is shown by the following reaction:

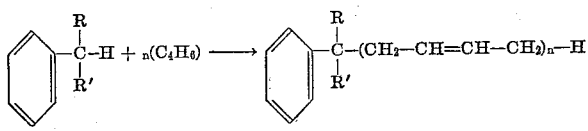

where R and R' are independently selected from the group consisting of hydrogen, methyl, ethyl, propyl and butyl and $n$ is a number from 1 to 4. It is preferable that R and R' both not be hydrogen as the resulting 1-phenyl alkane yields sulfonates of poor water solubility. The alkylbenzene is preferably selected from the group consisting of toluene, ethylbenzene, n-propyl benzene, cumene, secbutylbenzene, sec-amylbenzene and sec-hexylbenzene. Especially preferable alkylbenzenes are ethylbenzene and n-propylbenzene since they would yield 2-phenyl and 3-phenyl alkanes, respectively, which will provide phenyl alkane sulfonates of good water solubility and detergency.

The alkylbenzene and the reaction operating conditions should be selected such that the finally produced phenyl alkanes contain a total number of carbon atoms of from about 15 to about 24 and preferably from about 16 to about 22 carbon atoms per molecule. The reactor operating conditions should be selected to avoid polymerization of the butadiene or the formation of undesirable side products. The primary operating variables are pressure, temperature, liquid hourly space velocity (LHSV, volumes of feed per hour per volume of catalyst) and mole ratio of alkylbenzene to to butadiene. Typical operating conditions are temperature ranges of from about 80° to about 200° C., pressures of from about 200 to about 2,000 p.s.i.a., LHSV of from about 0.5 to about 5.0 and alkylbenzene to butadiene mole ratios of at least 1.5 to 1 and higher. The operating conditions are selected not only to obtain a highly selective reaction but also to obtain high yields and to economically produce the condensed product. The unconverted alkylbenzene and condensed product having less than 16 carbon atoms per molecule may be recycled back to the reaction zone to increase the ultimate yield, while the desired product is sent to the second step of the process.

The condensation reaction may be typically carried out by loading the alkaline catalyst into a fixed bed reactor and pressuring up to operating conditions with nitrogen. The temperature may be maintained by preheating the feed streams or by heaters on the reactor. The liquid feed alkylbenzene and butadiene are pumped into the reactor along with nitrogen whereupon the condensation reaction occurs. The reactor effluent is withdrawn and is thereafter separated into a gas phase comprising nitrogen and small amounts of unconverted butadiene, which are recycled back to the reactor, and a liquid phase comprising condensed product having the desired number of carbon atoms per molecule, unconverted alkylbenzene and condensed product having too few carbon atoms per molecule. The unconverted alkylbenzene and condensed product having too few carbon atoms are separated from the desired condensed product by ordinary fractionation and recycled back to the reactor. Additional makeup nitrogen may be provided to compensate for losses of dissolved gas in the liquid phase.

The second major step in this process is the selective hydrogenation of the aliphatic side-chain as shown by the following reaction:

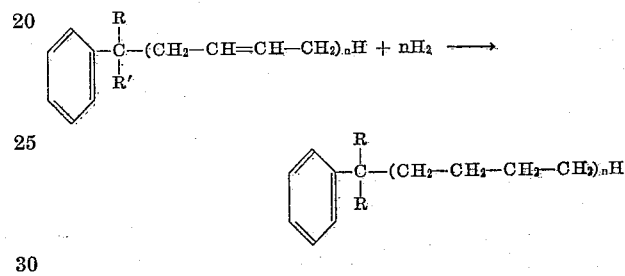

wherein R, R' and $n$ are as described hereinbefore. The hydrogenation of the aryl portion of the molecule is avoided by selection of appropriate hydrogenation conditions and a suitable hydrogenation catalyst. A preferable catalyst is a copper chromite catalyst comprising chromium oxide and copper oxide upon a high surface support. Typical operating conditions are temperature ranges of from about 50° to about 300° C. and pressure ranges of from about 25 to about 1,000 p.s.i.a. Other selective catalysts which may be used are Group VIII metals, particularly nickel and palladium. These selectively hydrogenate olefinic unsaturation at temperatures somewhat lower than required for copper chromite, room temperature being sometimes sufficient for hydrogenation with nickel supported on kieselguhr. The condensed product is introduced into a fixed bed containing the above-described hydrogenation catalyst in the presence of excess hydrogen and the reactor effluent is withdrawn from the reactor bed. The unconverted hydrogen is separated as a gas phase and is recycled back to the hydrogenation reactor bed, while the desired hydrogenated phenyl alkane product is withdrawn from the system.

The hydrophobic phenyl alkane is converted into a detergent by the introduction of a hydrophilic group into the molecule. This is readily accomplished by sulfonation. The phenyl alkane may be typically sulfonated by mixing with an equal volume of liquefied n-butane and then with 30% oleum which is added to the dilute phenyl alkane mixture as a small stream flowing onto the chilled surface of a rotating cylinder, the surface of the cylinder being cooled by circulating salt water at −10° C. on the inside of the cylinder as the latter is rotated. The sulfonation mixture is scraped from the surface of the cylinder and the mixture re-spread on the cylinder by a stainless steel blade, the n-butane evaporated into a hood as the heat of reaction raises the temperature and boils off the butane, thereby maintaining the temperature at or near the boiling point of n-butane at about 0° C. The sulfonated reaction mixture removed from the rotating cylinder is diluted by mixing with ice water. The resulting sulfonic and sulfuric acids dissolved in the aqueous solution are neutralized to a pH of 7 with sodium hydroxide. The product is a crystalline, white solid which is completely soluble in water. The evaporated solids are extracted with 70% ethanol and the ethanol extract is evaporated to dryness to recover sodium sulfate-free products. The product is thereafter mixed with sufficient sodium sulfate, sodium tripolyphosphate and other builder salts to provide detergent compositions containing about a 20/80 weight ratio of sodium alkylaryl sulfonate to builders.

*Example I*

A catalyst comprising 20% potassium amide on lithiated alumina (0.5% Li as $Li_2O$) is loaded into a block type isothermal fixed bed reactor. Special precautions are taken to avoid the introduction of moisture into the catalyst bed. Toluene and butadiene are introduced into the catalyst bed continuously at a 2 LHSV and at a toluene to butadiene mole ratio of 3.2:1.0. The reactor is maintained at 800 p.s.i. and at a 140° C. inlet catalyst bed temperature, resulting in a catalyst peak temperature of 155° C. The toluene-free product contains the following aromatics:

| | Weight percent |
|---|---|
| $C_6H_5CH_2(CH_2-CH=CH-CH_2)H$ | 20.6 |
| $C_6H_5CH_2(CH_2-CH=CH-CH_2)_2H$ | 55.7 |
| $C_6H_5CH_2(CH_2-CH=CH-CH_2)_3H$ | 14.7 |
| $C_6H_5CH_2(CH_2-CH=CH-CH_2)_4H$ | 8.9 |

*Example II*

A condensed product is prepared by the method described in Example I, although ethyl benzene is used instead of toluene. The condensed product is separated into a fraction in the $C_{16}$ to $C_{20}$ range. Said fraction is hydrogenated over a copper oxide-chromium oxide catalyst at 125° C. to yield the $C_{16}$–$C_{20}$ phenyl alkane. The phenyl alkane is sulfonated as hereinbefore described to produce a water-soluble detergent.

A second sample of detergent is prepared by alkylating benzene with a so-called propylene tetramer which consists of a mixture of isomers and homologs, all of which are of highly branched-chain structure containing dimethyl groupings as well as methyl and other short side-chains on the main carbon skeleton. The alkylate is sulfonated as hereinabove described to produce a highly branched detergent. Samples of each of the above detergent preparations are separately subjected to simulated sewage treatment conditions in order to determine the relative rates of removal and the extent of disappearance of each of the samples from a synthetic sewage mixture of known composition. A 0.003% aqueous solution of each of the above detergents (100 gallons each) is prepared and to each of the solutions are added 0.5 pounds of urea (to supply nitrogen nutrient), 0.2 pounds of sodium sulfate (to supply $SO_4$ nutrient) and trace quantities of zinc, iron, magnesium, manganese, copper, calcium and cobalt to provide the necessary nutritional requirements of the bacteria. The latter bacteria were supplied in the form of a one-pound cake of activated sewage sludge recovered from a sewage treatment plant. The simulated sewage composition, placed in a large circular tank, is stirred as air is introduced through fritted glass nozzles into the bottom of the tank in the form of fine bubbles. Approximately 50 cc. samples of the sewage suspension are removed from each of the tanks at three-hour intervals after an initial digestion period of 24 hours, filtered, and equal quantities of the filtrate (50 cc.) measured into shaker bottles to determine the height of foam produced after shaking each of the samples of filtrate under similar test conditions. Typical results of foam height determination, which is an empirical measure of the amount of detergent remaining in solution, are presented in the following Table I for a branched-chain alkyl group such as that prepared by alkylation of propylene tetramer and for a straight-chain alkyl group such as that prepared by the process of this invention.

TABLE I.—HEIGHT OF FOAM PRODUCED FROM 50 CC. SAMPLES OF SEWAGE SOLUTION AS A FUNCTION OF TIME

| Sample | Time Treatment in Hours | Foam Height, cm. | |
|---|---|---|---|
| | | Branched-Chain Alkyl Group Detergent | Straight-Chain Alkyl Group Detergent |
| 1 | 0 | 15 | 15 |
| 2 | 24+3 | 15 | 13 |
| 3 | 24+6 | 14 | 12 |
| 4 | 24+9 | 13.5 | 10 |
| 5 | 24+12 | 13 | 8 |
| 6 | 24+15 | 13 | 7 |
| 7 | 24+18 | 12.5 | 6 |
| 8 | 24+24 | 11.5 | 5 |
| 9 | 48+12 | 11 | 4 |
| 10 | 48+24 | 10.5 | 2 |
| 11 | 72+12 | 10 | 1 |

I claim as my invention:

1. A process for the production of detergents which comprises telomerizing butadiene with an alkylbenzene containing an alpha-hydrogen group and from 1 to 8 carbon atoms in the alkyl group in the presence of alkaline catalyst selected from the group consisting of alkali metal, alkali metal amide, alkali metal oxide, alkali metal alkoxide and alkali metal hydride dispersed on a refractory oxide support at a temperature of from about 80° to about 200° C., pressure of from about 200 to about 2,000 p.s.i.a., LHSV of from about 0.5 to about 5.0 and alkylbenzene to butadiene mole ratio of at least 1.5 to 1 to linearly add the butadiene to said alkyl group, hydrogenating the aliphatic side-chain of the resultant telomerization product with hydrogen at a temperature of from about 50° to about 300° C. and a pressure of from about 25 to about 1000 p.s.i.a. in the presence of a hydrogenation catalyst selected from the group consisting of Group VIII metals and copper chromite to form phenyl alkane, and introducing a hydrophilic sulfonic acid group into said phenyl alkane.

2. The process of claim 1 further characterized in that the alkaline catalyst comprises potassium amide on lithiated alumina.

3. The process of claim 1 further characterized in that the hydrophilic group is introduced into the phenyl alkane by sulfonation producing the sulfonic acid derivative and neutralized with a salt-forming base to produce a water-soluble aryl-aryl sulfonate detergent.

4. The process of claim 1 further characterized in that the hydrogenation catalyst comprises copper chromite dispersed on a high surface support.

5. The process of claim 1 further characterized in that said alkylbenzene is selected from the group consisting of toluene, ethylbenzene, *n*-propylbenzene, cumene, sec-butylbenzene, sec-amylbenzene and sec-hexylbenzene.

6. The process of claim 1 further characterized in that said alkylbenzene is ethylbenzene and said alkaline catalyst comprises potassium amide on lithiated alumina.

References Cited

UNITED STATES PATENTS

| 2,984,691 | 5/1961 | Fotis | 260—505 |
| 3,128,318 | 4/1964 | Meisinger et al. | 260—688 |
| 3,154,595 | 10/1964 | Donaldson | 260—671 |
| 3,196,174 | 7/1965 | Cohen | 260—505 |
| 3,206,519 | 9/1965 | Eberhardt | 260—671 |

LORRAINE A. WEINBERGER, *Primary Examiner.*

R. K. JACKSON, *Examiner.*

M. WEBSTER, *Assistant Examiner.*